United States Patent
Jung et al.

(10) Patent No.: US 8,542,185 B2
(45) Date of Patent: Sep. 24, 2013

(54) METHOD AND APPARATUS FOR OPERATING MOBILE TERMINAL

(75) Inventors: Han Chul Jung, Suwon-si (KR); Sun Ae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 801 days.

(21) Appl. No.: 12/633,456

(22) Filed: Dec. 8, 2009

(65) Prior Publication Data

US 2010/0141574 A1 Jun. 10, 2010

(30) Foreign Application Priority Data

Dec. 9, 2008 (KR) ........................ 10-2008-0124668

(51) Int. Cl.
*G09G 5/00* (2006.01)
(52) U.S. Cl.
USPC ......................................................... 345/156
(58) Field of Classification Search
None
See application file for complete search history.

(56) References Cited

U.S. PATENT DOCUMENTS

| | | | | |
|---|---|---|---|---|
| 5,602,566 A * | 2/1997 | Motosyuku et al. | ......... | 345/684 |
| 6,466,198 B1 * | 10/2002 | Feinstein | ....................... | 345/158 |
| 6,567,101 B1 * | 5/2003 | Thomas | ........................ | 345/649 |
| 6,573,883 B1 * | 6/2003 | Bartlett | ....................... | 345/156 |
| 6,847,351 B2 * | 1/2005 | Noguera | ........................ | 345/158 |
| 6,933,923 B2 | 8/2005 | Feinstein | | |
| 7,519,468 B2 * | 4/2009 | Orr et al. | ........................ | 701/433 |
| 7,721,968 B2 * | 5/2010 | Wigdor | ..................... | 235/472.01 |
| 2004/0125073 A1 | 7/2004 | Potter et al. | | |
| 2007/0180409 A1 | 8/2007 | Sohn | | |

FOREIGN PATENT DOCUMENTS

| | | |
|---|---|---|
| KR | 1020010051396 | 6/2001 |
| KR | 1020070079418 | 8/2007 |

* cited by examiner

*Primary Examiner* — K. Wong
(74) *Attorney, Agent, or Firm* — H.C. Park & Associates, PLC

(57) ABSTRACT

A method for operating a mobile terminal is disclosed. The mobile terminal includes a pressure sensor and an orientation sensor. While a pressure event is detected by the pressure sensor, functions related to content classification, content storage, content display, and menu navigation can be executed in response to a direction event detected by the orientation sensor. Hence, the mobile terminal is capable of operating in a dynamic and a flexible manner.

23 Claims, 8 Drawing Sheets

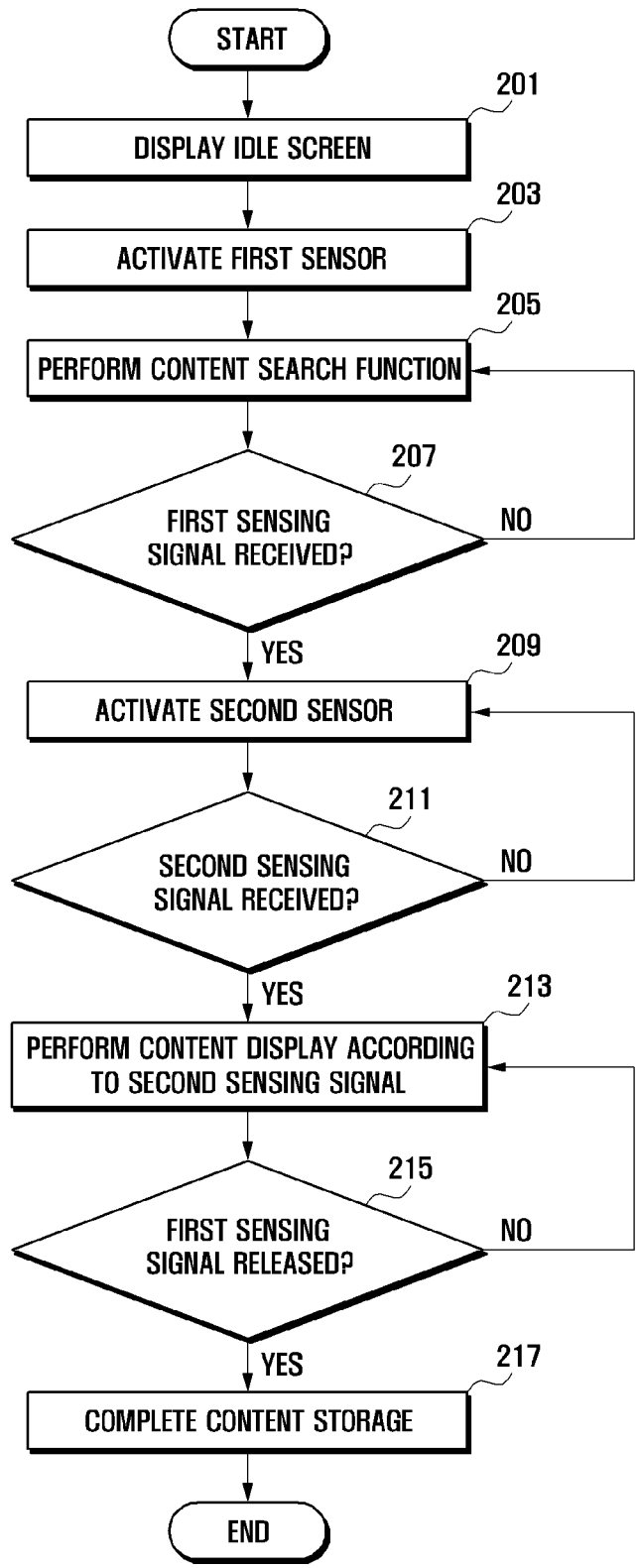

METHOD AND APPARATUS FOR OPERATING MOBILE TERMINAL

CROSS REFERENCE TO RELATED APPLICATION

This application claims priority from and the benefit of Korean Patent Application No. 10-2008-0124668, filed on Dec. 9, 2008, which is hereby incorporated by reference for all purposes as if fully set forth herein.

BACKGROUND OF THE INVENTION

1. Field of the Invention

Exemplary embodiments of the present invention relate to a method and apparatus of a mobile terminal to control storage, classification, and display of digital contents based on motion sensing signals.

2. Description of the Background

Recently, mobile terminals provide users with the convenience of mobility. Such a mobile terminal has developed significant adoption by consumers as an accepted mode having various functions related to the mobility. Examples of applications of terminals include, for example, an audio file playback through an MP3 player, an image capture through a digital camera module, and mobile gaming or arcade gaming.

To generate input signals, a mobile terminal can be equipped with an input means such as a keypad or a touch screen. For example, the touch screen can display a keymap for inputting keys to be displayed on a display section, can support effectively extending the display section. In this way, modern mobile terminals can employ touch screens as input and display means. However, to use a touch screen as an input means requires a terminal to display a keymap of many keys on a small display section, requiring precise touch actions. When the user has difficulty in precisely touching a specific zone of the touch screen (e.g., when the user is wearing gloves), the user may be unable to generate a desired input signal that results in degraded performance of the touch screen as an input means.

SUMMARY OF THE INVENTION

Exemplary embodiments of the present invention provide an operation method and an apparatus to easily generate input signals for operating the mobile terminal in an intuitive and flexible manner.

Additional features of the invention will be set forth in the description which follows, and in part will be apparent from the description, or may be learned by practice of the invention.

Exemplary embodiments of the present invention disclose a method. The method includes detecting a pressure event according to a pressure applied to a mobile terminal, activating an orientation sensor, generating, while the pressure event is being detected, a direction signal corresponding to a direction event detected by the orientation sensor according to a movement of the mobile terminal in a direction, and performing at least one function according to the generated direction signal. The at least one function includes at least one of a content classification and storage function, a content display function, and a menu navigation function.

Exemplary embodiments of the present invention disclose an apparatus including a pressure sensor, an orientation sensor, and a control unit. The pressure sensor detects a pressure event according to a pressure applied to the mobile terminal. The orientation sensor detects, while the pressure event is being detected, a direction event according to a movement of the mobile terminal in a direction. The control unit controls performing at least one function according to the detected direction event. The at least one function includes at least one of a content classification and storage function, a content display function, and a menu navigation function.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 5 is a flow chart illustrating a method for operating a mobile terminal according to exemplary embodiments of the present invention.

DETAILED DESCRIPTION OF THE ILLUSTRATED EMBODIMENTS

Figure 1:
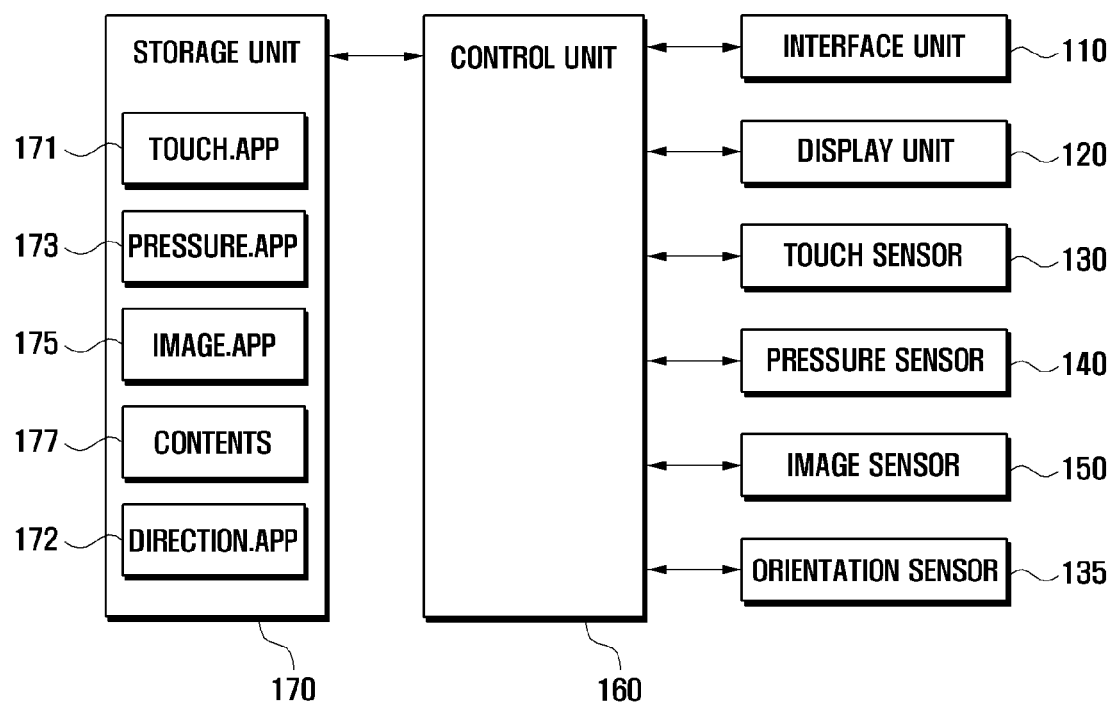
FIG. 1 is a block diagram of a mobile terminal according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, exemplary embodiments of the present invention are described in detail with reference to the accompanying drawings.

FIG. 1 is a block diagram of a mobile terminal 100 according to exemplary embodiments of the present invention. The mobile terminal 100 may be a cellular handset (or phone), a cordless phone, a mobile transmitter, a stationary wireless transmitter, a wireless personal digital assistant (PDA), a wireless modem, or a pager. Referring to FIG. 1, the mobile terminal 100 may include an interface unit 110 and a display unit 120. The display unit 120 may be coupled to the control unit 160 and configured to display information to a user. The mobile terminal 100 may also include various types of sensors, for example, a touch sensor 130, an orientation sensor 135, a pressure sensor 140, an image sensor 150, a storage unit 170, and a control unit 160. The touch sensor 130 may correspond to an input means, and may be replaced with, or coexist with, a keypad or a touch pad.

In the mobile terminal 100, the pressure sensor 140 and the orientation sensor 135 can be utilized for detecting an input, classifying collected contents, controlling playback of contents stored in the storage unit 170, and selecting menus associated with user functions.

The interface unit 110 can include a wired or wireless channel for communication with another mobile terminal, a mobile communication system, or a server. The interface unit 110 may also provide a two-way data communication coupling to a network link (not shown). The interface unit 110 can send and receive electrical, electromagnetic, or optical signals that carry digital data streams representing various types of information. For example, when the mobile terminal 100 performs a function related to wireless communication, the interface unit 110 may function as a radio frequency unit. When the mobile terminal 100 performs a function related to wired (serial) communication, the interface unit 110 can function as a universal serial bus (USB) interface or a universal asynchronous receiver/transmitter (UART) interface. The interface unit 110 may receive or transmit a digital content through a communication channel from or to another mobile terminal, a mobile communication system, and/or an Internet network.

The display unit 120 can output a screen associated with an activated function. For example, the display unit 120 may display a boot screen, idle screen, menu screen, or a content-related screen. The display unit 120 may employ a liquid crystal display (LCD) technology or organic light emitting diode (OLED) technology, and may include a panel driver for operating a panel, a frame memory for storing data, and various types of display devices. In this manner, the display unit 120 can output a playback screen for a content stored in the storage unit 170 or a content captured by the image sensor 150, and may display a preset direction arrow image in response to a sensing signal provided by the pressure sensor 140 controlled by the control unit 160. The direction arrow image may change in response to an occurrence of a direction event. For example, a direction arrow image having appeared at the occurrence of a pressure event may be replaced with another direction arrow image in response to occurrence of a direction event. When a direction arrow image is displayed, the display unit 120 may slightly dim the content playback screen to indicate deactivation of the touch sensor 130.

The touch sensor 130 may be installed at the front of the display unit 120, may sense a touch (e.g., touch event) of a finger or a stylus pen, and may generate a corresponding touch signal. The touch sensor 130 may include an array of sensing elements to support multi-touch operations. When a touch event occurs, the touch sensor 130 can send the touch event to the control unit 160. The touch event may indicate a touch point and various types of touch including, for example, a touch down, a touch up, a drag, a flick, and/or a multi-touch (a combination of multiple touches).

The orientation sensor 135 may include at least one of a tilt sensor, an acceleration sensor, a gyro sensor, and a geomagnetic sensor. The orientation sensor 135 may detect a direction event (e.g., when the mobile terminal 100 is rotated by the user in a specific direction and with a slope greater than or equal to a given angle), and may generate and send a direction signal corresponding to the direction event to the control unit 160. The direction event may indicate the movement direction of the mobile terminal 100. The orientation sensor 135 may remain deactivated, and can be activated under the control of the control unit 160 after detection an event by the pressure sensor 140. As the orientation sensor 135 generates direction information in real time according to movement of the mobile terminal 100, the orientation sensor 135 may be initialized for direction information generation in consideration of the current placement of the mobile terminal 100 according to a sensing signal from the pressure sensor 140. After initialization, the orientation sensor 135 may continuously generate direction information corresponding to 16 or 36 directions including, for example, up, down, left, right, front and rear, according to movement of the mobile terminal 100.

The pressure sensor 140 may include one or more sensing elements at the housing of the mobile terminal 100. The pressure sensor 140 may sense forces or pressure applied to the housing of the mobile terminal 100. The pressure sensor 140 may generate a pressure sensing signal corresponding to the pressure applied to the housing and may send the pressure sensing signal to the control unit 160. For example, when a user seizes or presses a portion of the mobile terminal 100 at which the pressure sensor 140 is installed, the pressure sensor 140 may generate a corresponding pressure sensing signal.

The image sensor 150 may capture an image through a lens, and may send the image via the control unit 160 to the display unit 120, or to the storage unit 170 for storing the image, according to the user selection. The image sensor 150 may be a charge-coupled device (CCD) sensor or a complimentary metal-oxide semiconductor (CMOS) sensor. The image sensor 150 may adjust the focal length of the lens to zoom in or zoom out the image under the control of the control unit 160. The image sensor 150 may optionally have an auto-focusing function.

The storage unit 170 may store various application programs for operating the mobile terminal 100. The storage unit 170 may include digital contents received from an external mobile terminal or server. The storage unit 170 may include a program area and a data area.

The program area may store an operating system (OS) for booting the mobile terminal 100, application programs for supporting various functions of the mobile terminal 100 related to call processing, file playback, menu selection, photograph list searching, message composition, and Web browsing. The program area may store a touch sensing program (touch.app) to operate the touch sensor 130, a pressure sensing program (pressure.app) 173 to operate the pressure sensor 140, an orientation sensing program (direction.app) 172 to operate the orientation sensor 135, and an image sensing program (image.app) 175 to operate the image sensor 150. When the mobile terminal 100 is turned on, the touch sensing program (touch.app) 171, the pressure sensing program (pressure.app) 173, and the orientation sensing program (direction.app) 172 may be selectively activated according to preset conditions. For example, after booting the mobile terminal 100, the touch sensing program (touch.app) 171 may be activated to support a basic input function. The pressure sensing program (pressure.app) 173 may be activated in connection with another application program (e.g., the image sensing program image.app 175). For example, when the user generates an input signal for activating the image sensor 150 by operating the touch sensor 130, the image sensing program (image.app) 175 may be activated together with an activation of the pressure sensing program (pressure.app) 173.

The data area is a storage section that stores data generated by the use of the mobile terminal 100, and may store user data related to various supplementary functions, such as images and moving images captured by the image sensor 150, phonebook data, audio data, and metadata. For example, the data area may store a plurality of contents 177 that are received through the interface unit 110 from an external system or another mobile terminal. The contents 177 may include, for example, images, text, files, and other information. The contents 177 may further include icons for supporting menus. The data area may include a virtual file folder corresponding to indexes used for classifying and storing the contents 177. A particular content stored in the virtual file folder may be sent via the control unit 160 to the display unit 120 according to a sensing signal from a sensor. A content being output to the display unit 120 may be stored in a virtual file folder according to a sensing signal received from a sensor.

Figure 2:
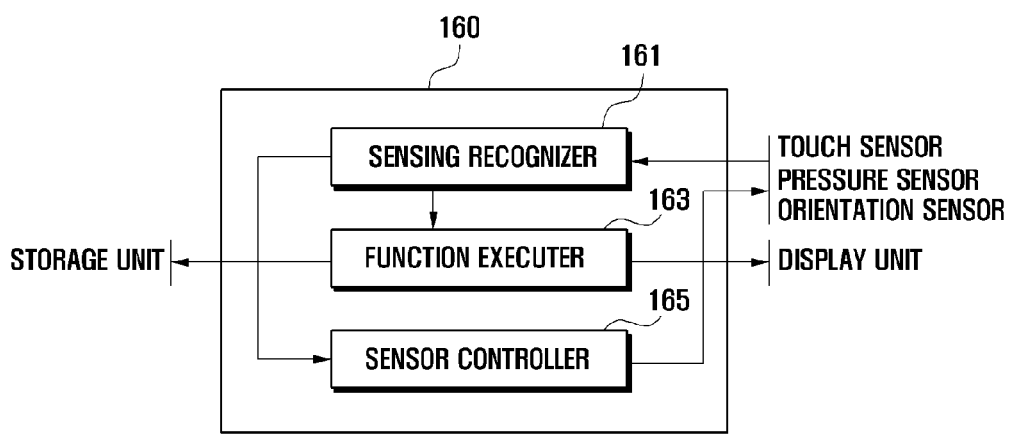
FIG. 2 is a diagram of a control unit in the mobile terminal according to exemplary embodiments of the present invention.

The control unit 160 may control power supply (not shown) to the mobile terminal 100, activation of individual components of the mobile terminal 100, and signal exchange between the components. The control unit 160 may control selective operations of the touch sensor 130, the pressure sensor 140, and the orientation sensor 135 according to a user request, and may perform a control operation in response to a touch event, pressure event, or direction event received from the touch sensor 130, pressure sensor 140, or orientation sensor 135. As shown in FIG. 2, the control unit 160 may include a sensing recognizer 161, a function executer 163, and a sensor controller 165.

FIG. 2 is a diagram of a control unit 160 of a mobile terminal 100 according to exemplary embodiments of the present invention.

Referring to FIG. 2, the sensing recognizer 161 is configured to receive a touch signal, a pressure sensing signal, and a direction signal from the touch sensor 130, the pressure sensor 140, and the orientation sensor 135, respectively. The sensing reorganizer 161 may send the received touch signal, pressure sensing signal, and direction signal to the function executer 163. The touch signal may correspond to a sensing signal transmitted from the touch sensor 130 installed at the front surface of the display unit 120. The sensing signal may indicate a touched point at which the touch event is detected. The pressure sensor 140 may generate a pressure sensing signal according to a force or a pressure applied to the housing of the mobile terminal 100, and may send the pressure sensing signal to the sensor recognizer 161. The orientation sensor 135 (e.g., gyro sensor, acceleration sensor or a tilt sensor) may sense movement of the mobile terminal 100 caused by an applied force and may indicate the movement direction by generating and sending a direction signal to the sensor recognizer 161.

Upon receiving the touch signal, pressure sensing signal, or direction signal from the sensing recognizer 161, the function executer 163 can execute one or more functions associated with the received signals. For example, when a touch signal is received, the function executer 163 may identify a function mapped to the touched point by comparing the touched point with a keymap or icon map. The function executer 163 may then execute the identified function. The icon map may associate various icons for menus with locations on the display unit 120. The icon map may specify the locations of the individual icons on the display unit 120.

When a pressure sensing signal is received, the function executer 163 may prevent a touch event from occurring, and may control the display unit 120 to display a preset image such as a direction arrow image. The function executer 163 may also keep the touch event activated. The function executer 163 may control the display unit 120 so that the direction arrow image is more clearly viewed on a currently output content. For example, the function executer 163 may control the display unit 120 to dim the content playback screen and to make the direction arrow image brighter for better contrast.

When a direction signal is received, while a pressure event is sustained, the function executer 163 may perform an operation associated with the direction event corresponding to the direction signal. For example, when a direction event occurs in relation to the left arrow of the direction arrow image while a pressure event is sustained, the function executer 163 may execute an operation (e.g., storing a content that is currently output to the display unit 120 in a given folder) associated with the left arrow.

The sensor controller 165 may control the activation time of the pressure sensor 140 according to a touch signal received by the sensing recognizer 161, and may control the activation time of the orientation sensor 135 according to a pressure sensing signal. For example, after booting/initializing the mobile terminal 100, the sensor controller 165 may load the touch sensing program (touch.app) 171 from the storage unit 170 to initialize and activate the touch sensor 130. Thereafter, when a touch event is detected by the touch sensor 130, the sensor controller 165 may load the pressure sensing program (pressure.app) 173 from the storage unit 170 to activate the pressure sensor 140. In some cases, the sensor controller 165 may initialize and activate the touch sensor 130 and pressure sensor 140 at the same time. The sensor controller 165 may load the touch sensing program (touch.app) 171 and the pressure sensing program (pressure.app) 173 to activate the touch sensor 130 and the pressure sensor 140 simultaneously when the display unit 120 is turned on. The sensor controller 165 may also deactivate the touch sensor 130 and the pressure sensor 140 when the display unit 120 is turned off or is operating in sleep mode. The sensor controller 165 may control the supply of power to the touch sensor 130 and the pressure sensor 140.

When a pressure sensing signal is received from the pressure sensor 140, the sensor controller 165 may initialize the orientation sensor 135. When a pressure sensing signal corresponding to a pressure release event is received from the pressure sensor 140, the sensor controller 165 may deactivate the orientation sensor 135 by, for example, blocking power supply thereto, and keeping the touch sensor 130 and pressure sensor 140 activated. A pressure release event may occur, for example, if the user releases the user's grip on the mobile terminal 100.

As described above, the touch sensor 130 may initially be activated, the pressure sensor 140 may be activated next, and the orientation sensor 135 may be activated when a pressure event is detected by the pressure sensor 140 and a pressure sensing signal sent to the sensing recognizer 161. Thereafter, when a direction event is detected by the orientation sensor 135 while the pressure event is maintained, a user function may be executed according to a direction indicated by the direction event.

Figure 3:
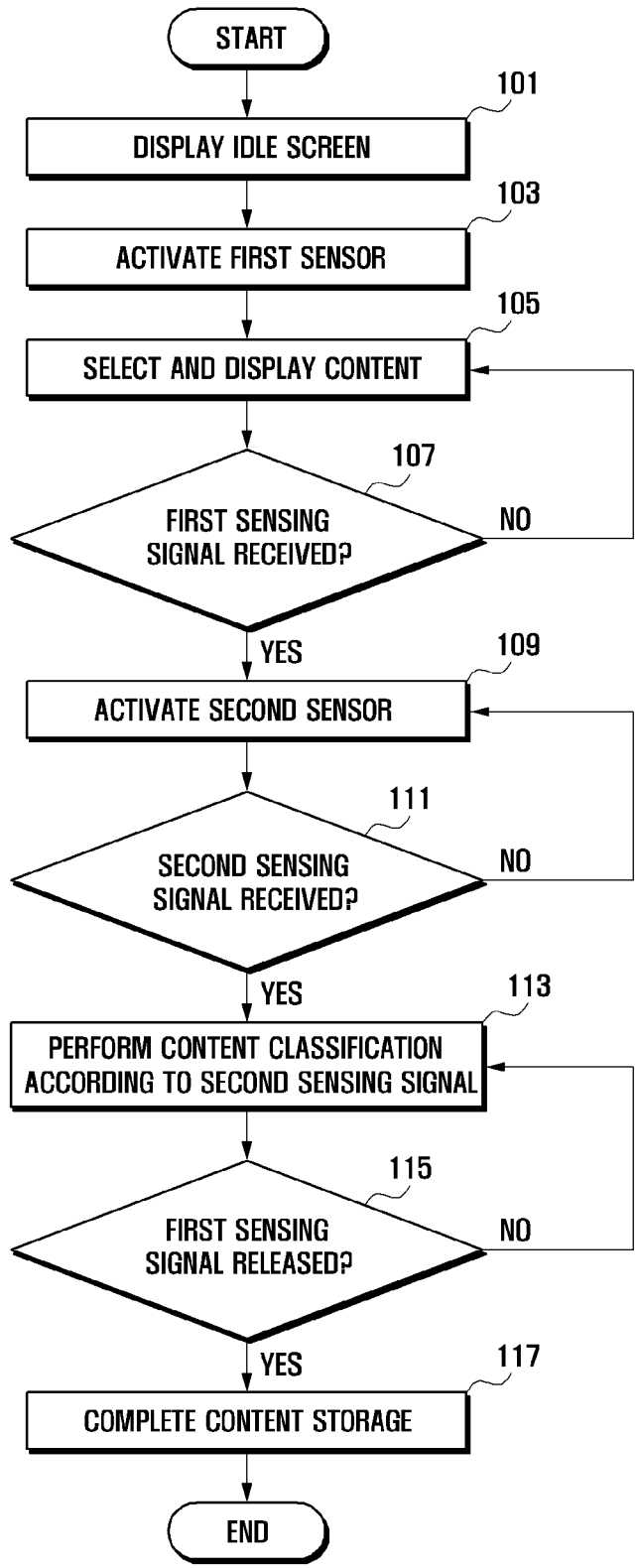
FIG. 3 is a flow chart illustrating a method for operating a mobile terminal according to another exemplary embodiment of the present invention.
Figure 4A:
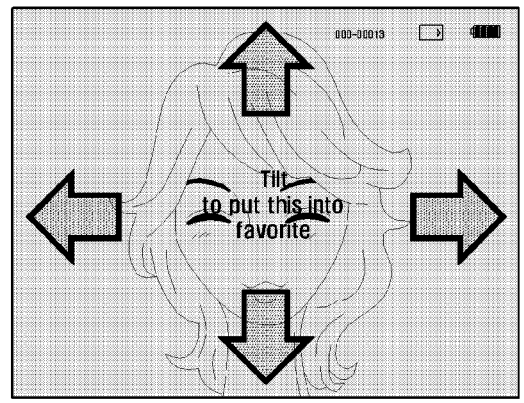
FIG. 4A, FIG. 4B, and FIG. 4C are exemplary views illustrating the method of FIG. 3, according to exemplary embodiments of the present invention.
Figure 4B:
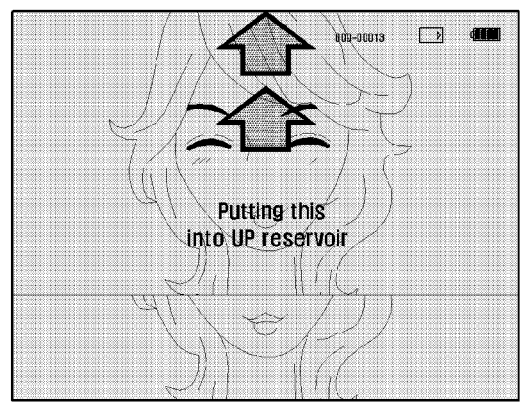
Figure 4C:
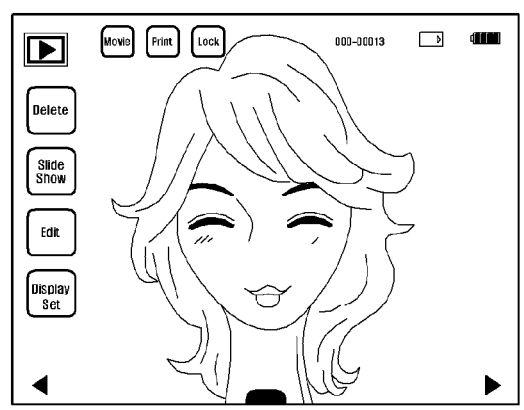

FIG. 3 is a flow chart illustrating a method for operating a mobile terminal according to exemplary embodiments of the present invention. FIG. 4A, FIG. 4B and FIG. 4C are views illustrating the method of FIG. 3, according to exemplary embodiments of the present invention. In the following description, an image captured by the image sensor 150 can be classified and stored.

As shown in FIG. 3, FIG. 4A, FIG. 4B, and FIG. 4C, when the mobile terminal 100 is turned on, the control unit 160 may perform a booting procedure, and may control the display unit 120 to display an idle screen (101). The control unit 160 may activate the touch sensor 130 to detect an input. After activation of the touch sensor 130, the control unit 160 may activate a first sensor, for example, the pressure sensor 140 (103). The control unit 160 may then select a content 177 stored in the storage unit 170 according to a touch signal received from the touch sensor 130, and may control the display unit 120 to display the selected content (105).

The control unit 160 may determine whether a first sensing signal (e.g., a pressure sensing signal) is received from the first sensor (107). When the first sensing signal is not received, the control unit 160 may return to step 105 and may continue to display the selected content.

When a first sensing signal is received, the control unit 160 may activate and initialize a second sensor, for example, the orientation sensor 135 (109). Referring to FIG. 4A, when the first sensing signal is received, the control unit 160 may control the display unit 120 to display, for example, a direction arrow image. For example, in response to a first sensing signal from the first sensor, the control unit 160 may control the display unit 120 to dim the content playback screen and to display the direction arrow image. The control unit 160 may further control the display unit 120 to display, for example, a text notice indicating a user function to be executed according to a sensing signal from the second sensor. The control unit 160 may deactivate the touch sensor 130 or may maintain the touch sensor 130 in an activated mode according to the user's settings.

After activation of the second sensor, the control unit 160 may determine whether a second sensing signal (e.g., a direction sensing signal) is received from the second sensor (111). When a second sensing signal is not received, the control unit 160 may return to step 109 and may keep the second sensor activated.

When a second sensing signal is received, the control unit 160 may perform content classification according to the second sensing signal (113). For example, referring to FIG. 4A and FIG. 4B, when a direction event is generated by tilting the mobile terminal 100 upward, the control unit 160 may execute a user function that can store a currently output content in an upper virtual folder according to, for example, a direction signal corresponding to the direction event. The control unit 160 may control the display unit 120 to represent upward movement of an image corresponding to the currently output content to indicate to the user that the currently output content is being stored. The control unit 160 may further control the display unit 120 to output a direction arrow image indicating progress of the content storage, and to output a textual function description on a screen of the display unit 120. Although FIG. 4A and FIG. 4B illustrate an example of handling an upward direction event for the mobile terminal 100, other direction events such as a left direction event, right direction event, and/or downward direction event may also be controlled through display of direction arrow images and movement of a content image in corresponding directions.

As seen in FIG. 4A, the control unit 160 may output an image indicating the detection of a direction event. For example, when the mobile terminal 100 is tilted upwards at an angle greater than or equal to a preset angle, the control unit 160 may control the display unit 120 to output a notice indicating detection of an upward direction event. To indicate detection of the upward direction event, the control unit 160 may control the display unit 120 to change a shape or color of the up arrow so that the up arrow can easily be distinguished from other arrows in the direction arrow image. When the mobile terminal 100 returns to the previous state at which the first sensing signal is generated, the control unit 160 may consider the upward direction event as valid and control the display unit 120 to display a screen as shown in FIG. 4A.

Referring back to FIG. 3, the control unit 160 may determine whether the first sensing signal is released (115). If the control unit 160 determines that the first sensing signal is not released, the control unit 160 may return to step 113 and may continue to perform content classification. If the first sensing signal is released, the control unit 160 may completes content storage (117). Completion of content storage may also be indicated by ending content image movement in the screen as shown in FIG. 4B.

After completing content storage, the control unit 160 may control the display unit 120 to restore the original screen prior to generation of the first sensing signal as shown FIG. 4C. Thereafter, a preview image captured by the image sensor 150 may be displayed on the display unit 120, and various icons for controlling the image sensor 150 may also be displayed.

Although the above procedure can be applied to classify and store an image captured as content by the image sensor 150, the above procedure may also be applied to classify and store a content that is selected from the storage unit and displayed. As described above, a content may be classified and stored in response to a second sensing signal while a first sensing signal is sustained. The content may be moved in a direction indicated by the second sensing signal to a virtual file folder for storage.

FIG. 5 is a flow chart illustrating another method for operating the mobile terminal 100 according to exemplary embodiments of the present invention. FIG. 6A, FIG. 6B, FIG. 6C and FIG. 6D illustrate screen representations corresponding to the method of FIG. 5 according to exemplary embodiments of the present invention. In the following description, images stored in the storage unit 170 of the mobile terminal can be searched for and displayed.

Referring to FIG. 5, FIG. 6A, FIG. 6B, FIG. 6C, and FIG. 6D, when the mobile terminal 100 is turned on, the control unit 160 may perform a booting procedure, and may then control the display unit 120 to display an idle screen (201). The controller 160 may then activate the touch sensor 130 to detect an input. After activation of the touch sensor 130, the control unit 160 may activate a first sensor, for example, the pressure sensor 140 (203). In response to receiving a touch signal from the touch sensor 130 when a touch event is detected, the control unit 160 may perform a search function for contents 177 stored in the storage unit 170 (205). For example, when the user selects an image search function through manipulation of the touch sensor 130, the control unit 160 may control the display unit 120 to display multiple stored images on a multi-view screen.

The control unit 160 may then determine whether a first sensing signal (e.g., a pressure sensing signal) is received from the first sensor (207). If the control unit 160 determines that a first sensing signal has not been received, the control unit 160 may return to step 205 and may continue to display the multi-view screen.

Figure 6A:
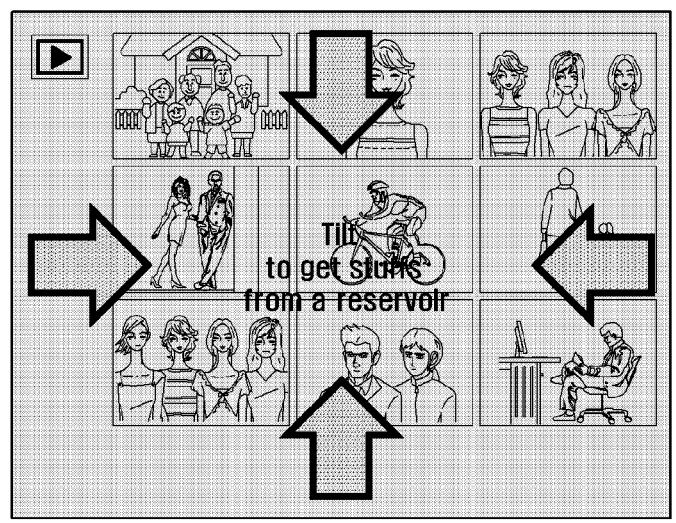
FIG. 6A, FIG. 6B, FIG. 6C, and FIG. 6D illustrate screen representations corresponding to the method of FIG. 5 according to exemplary embodiments of the present invention.

When a first sensing signal is received, the control unit 160 may activate and initialize a second sensor, for example, the orientation sensor 135 (209). As shown in FIG. 6A, when the first sensing signal is received, the control unit 160 may control the display unit 120 to display, for example, a direction arrow image as an overlay on the multi-view screen. For example, in response to a first sensing signal from the first sensor, the control unit 160 may control the display unit 120 to dim the current multi-view screen and to display the direction arrow image on the multi-view screen. The control unit 160 may further control the display unit 120 to display, for example, an execution of a text notice indicating a user function to be executed according to a sensing signal transmitted from the second sensor. The control unit 160 may deactivate the touch sensor 130 or may keep the touch sensor 130 activated according to user settings. The direction arrow image may be changed to indicate the direction of an occurring direction event.

After activation of the second sensor, the control unit 160 may determine whether a second sensing signal (e.g., a direction sensing signal) is received from the second sensor (211). When a second sensing signal has not been received, the control unit 160 may return to step 209 and may keep the second sensor activated.

Figure 6B:
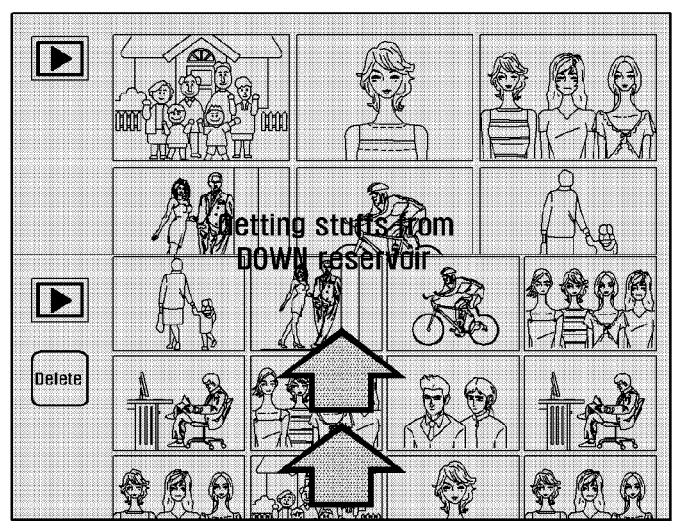

When a second sensing signal is received, the control unit 160 may perform content display according to the second sensing signal (213). As shown in FIG. 6A and FIG. 6B, when a direction event is generated by tilting the mobile terminal upwards, the control unit 160 may execute a user function that outputs, to the display unit 120, contents 177 stored in a lower virtual folder according to the direction event. At the same time, to intuitively represent selection of the lower virtual folder, the control unit 160 may control the display unit 120 to replace the original multi-view screen with another multi-view screen for images stored in the lower virtual folder. As shown in FIG. 6B, the control unit 160 may further control the display unit 120 to output a direction arrow image indicating progress of displaying and/or storing content in the upper direction, and to output a textual function description on a screen region. Although FIG. 6A and FIG. 6B may illustrate an example of handling an upward direction event for the mobile terminal 100, other direction events, such as, for example, a left direction event, a right direction event, and a downward direction event, may also be handled through display of direction arrow images and movement of the mobile terminal 100 in corresponding directions. When the original screen is not a multi-view screen, the control unit 160 may control the display unit 120 to move displayed images in the direction indicated by a direction event to form a new multi-view screen.

Figure 6C:
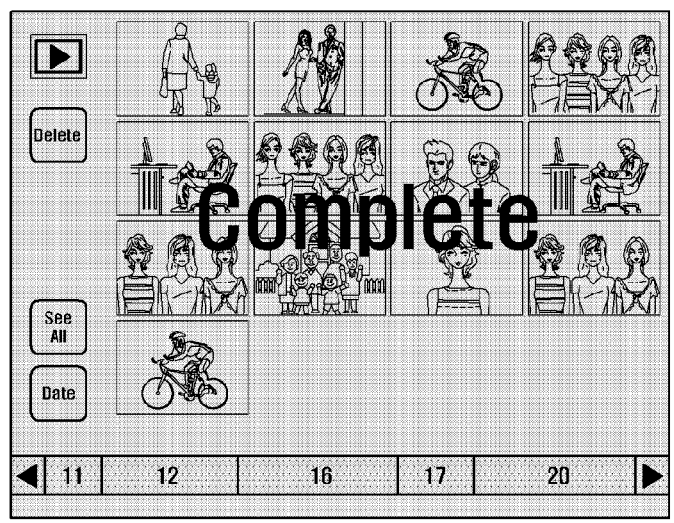

Referring back to FIG. 5, the control unit 160 may determine whether the first sensing signal is released (215). If the first sensing signal is not released, the control unit 160 may return to step 213 and may continue to search and display content. If the first sensing signal is released, the control unit 160 can complete displaying and/or storing content (217). Completion of displaying and/or storing content may also be indicated by ending content image movement in the screen of the display unit 120, or by outputting a text string, for example 'complete,' to display a new multi-view screen, as shown in FIG. 6C.

Figure 6D:
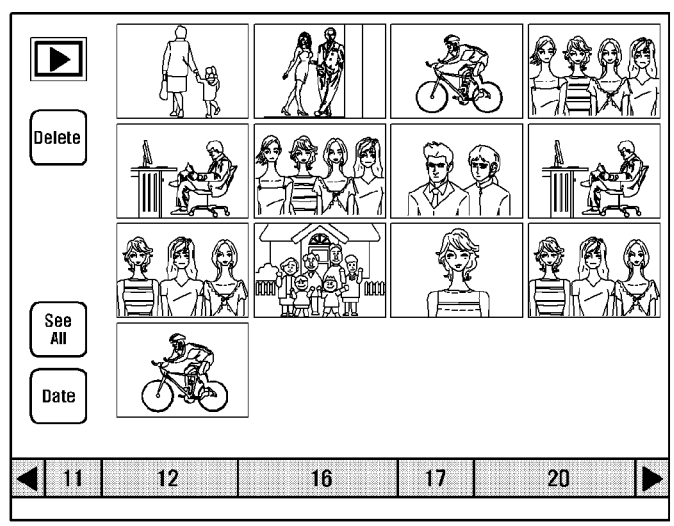

After completion of content display or storage, the control unit 160 may control the display unit 120 to terminate display of the direction arrow image that appeared in response to the first sensing signal, as shown in FIG. 6D. Thereafter, the multi-view screen may return to the previous brightness, and various icons for controlling content search and display may be displayed.

As described above, when a second sensing signal is received while a first sensing signal is sustained, contents 177 stored in a direction indicated by the second sensing signal may be displayed on the screen. The control unit 160 may control the display unit 120 to display the contents 177 on a multi-view screen as described above, or to display the most recently stored content or the most frequently accessed content in, for example, a full screen mode. If no content can be provided by the indicated direction, the control unit 160 may control an operation to output a pop up, alert, or vibration indicating a lack of content.

Figure 7:
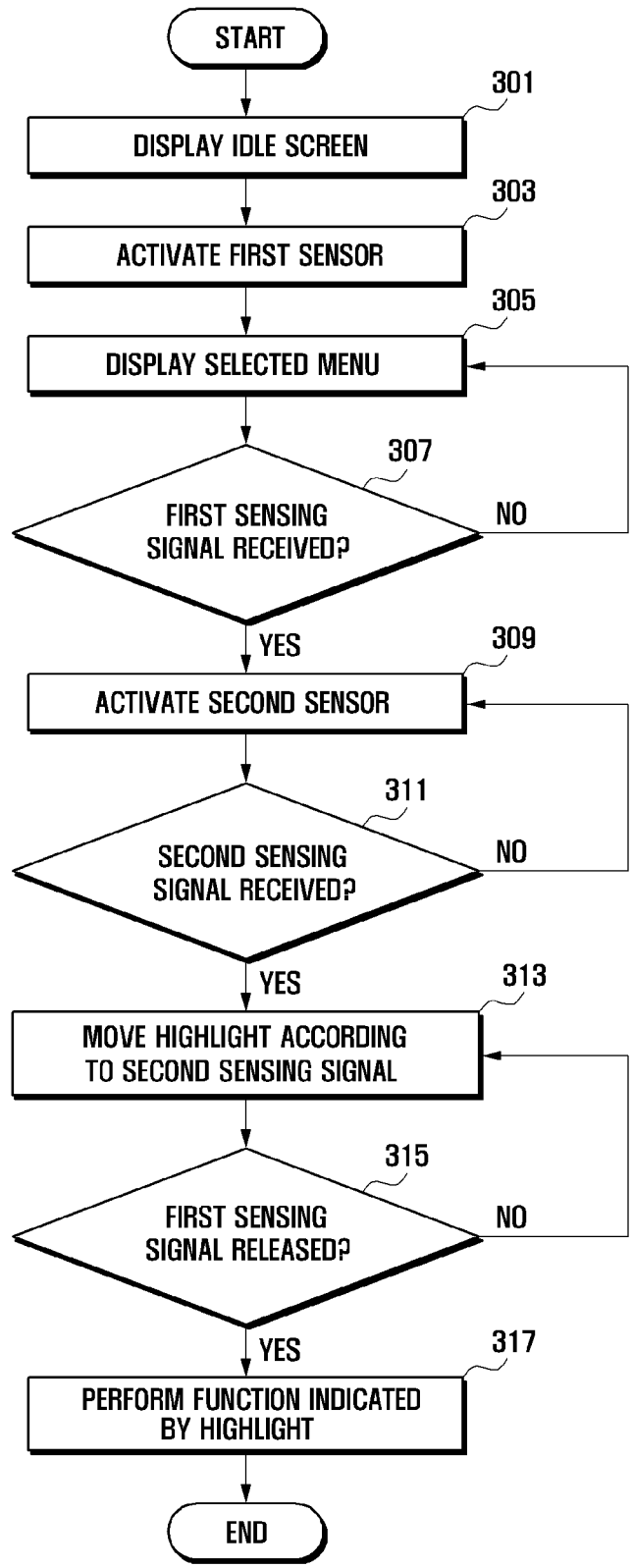
FIG. 7 is a flow chart illustrating a method for operating a mobile terminal according to exemplary embodiments of the present invention.

FIG. 7 is a flow chart illustrating another method for operating a mobile terminal 100 according to exemplary embodiments of the present invention.

Referring to FIG. 7, when the mobile terminal is turned on, the control unit 160 may perform a booting procedure, may control the display unit 120 to display an idle screen (301), and may activate the touch sensor 130 to detect an input. After activation of the touch sensor 130, the control unit 160 may activate a first sensor, for example, the pressure sensor 140 (303). The control unit 160 may select a menu according to a touch event detected by the touch sensor 130, and may control the display unit 120 to display the selected menu (305).

The control unit 160 may determine whether a first sensing signal (e.g., a pressure sensing signal) is received from the first sensor (307). If a first sensing signal is not received, the control unit 160 may return to step 305 and may continue to display the selected menu.

If the first sensing signal is received, the control unit 160 may activate and initialize a second sensor, for example, the orientation sensor 135 (309). For example, when a first sensing signal is received from the first sensor, the control unit 160 may control the display unit 120 to display a menu screen and to display a highlight for selecting a menu item or list item on the menu screen. The control unit 160 may control the display unit 120 to dim the menu screen for easy recognition of the highlight and to place the highlight on an item selected according to preset conditions.

After activation of the second sensor, the control unit 160 may determine whether a second sensing signal (e.g., a direction sensing signal) is received from the second sensor (311). If a second sensing signal is not received, the control unit 160 may return to step 309 and may keep the second sensor activated.

If the second sensing signal is received, the control unit 160 may control the display unit 120 to move the highlight according to the second sensing signal (313). For example, the control unit 160 may control the display unit 120 to move the highlight on the menu screen to, for example, navigate a menu in a direction indicated by the direction event. When direction events repeatedly occur in a predetermined time duration, the control unit 160 may control the display unit 120 to move the highlight in a corresponding direction. The highlight may be moved in multiple directions, including, for example, up, down, left, right, or diagonal.

Thereafter, the control unit 160 may determines whether the first sensing signal is released (315). If the first sensing signal is not released, the control unit 160 may return to step 313 and may continue performing menu navigation operations. If the first sensing signal is released, the control unit 160 may select an item being highlighted by the highlight and may perform a function associated with the selected item (317). For example, when the highlight indicates an item associated with short text messaging, the control unit 160 may display a submenu screen containing items associated with, for example, message viewing and message composition. If the first sensing signal is released while the highlight is placed on the item of message composition, the control unit 160 may display a message composition window. If the highlight indicates a particular image, the control unit 160 may control the display unit 120 to enlarge the image. If the highlight indicates an audio file, the control unit 160 may playback the audio file.

As described above, while a first sensing signal is sustained, a highlight can be moved on a menu screen in response to receiving a second sensing signal. When the first sensing signal is released, an item indicated by the highlight may be selected and a function associated with the item may be executed.

According to exemplary embodiments of the invention, after an idle screen is displayed and a pressure event is detected, a menu item may be listed on the display unit 120 in response to detection of a direction event. For example, after a pressure event is generated when a direction event is generated by tilting the mobile terminal 100 towards a left direction, the control unit 160 may control the display unit 120 to output a menu item associated with a left direction event. The control unit 160 may control the display unit 120 to output menu items for controlling a running application program during menu display.

As apparent from the above description, exemplary embodiments of the invention provide a method for operating a mobile terminal 100 wherein classification, storage, and playback of contents 177 and menu control can be performed in a dynamic and flexible manner according to pressure events and direction events generated by the mobile terminal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, comprising:
   detecting a pressure event according to a pressure applied to a mobile terminal;
   activating an orientation sensor;
   displaying, while the pressure event is being detected, an image indicating a direction to receive a direction event detected by the orientation sensor according to a movement of the mobile terminal in the indicated direction;
   commencing to perform at least one function upon detection of the direction event and the pressure event, the at least one function comprising at least one of a content classification and storage function, a content display function, and a menu navigation function; and
   completing the at least one function in response to detection of release of the pressure event.

2. The method of claim 1, further comprising:
   displaying, on a display unit, a direction arrow on the image, the image comprising text information associated with the at least one function in response to detection of the pressure event.

3. The method of claim 2, further comprising:
   displaying one arrow corresponding to the direction, the one arrow being displayed distinctively from other arrows in the direction arrow image.

4. The method of claim 1, wherein performing at least one function comprises:
   creating, when performing the content classification and storage function, a file folder corresponding to the direction; and
   storing, in response to detecting the direction event, a displayed content in the created file folder corresponding to the direction associated with the direction event.

5. The method of claim 4, wherein performing at least one function further comprises moving an image associated with the displayed content in the direction associated with the direction event.

6. The method of claim 1, wherein performing at least one function comprises:
   identifying, when performing the content display function, a file folder corresponding to the direction associated with the direction event; and
   displaying, on a display unit, at least one content stored in the identified file folder.

7. The method of claim 6, wherein displaying at least one content comprises one of:
   listing multiple contents stored in the file folder on a multi-view screen;
   displaying a most recently stored content of the multiple contents; and
   displaying a most frequently accessed content of the multiple contents.

8. The method of claim 6, wherein displaying at least one content comprises displaying a stored content on a full screen.

9. The method of claim 6, wherein performing at least one function further comprises displaying, when no content is stored in the identified virtual file folder, an alert indicating a lack of content.

10. The method of claim 1, wherein performing at least one function comprises:
    generating, when performing the menu navigation function, a highlight on a screen of the mobile terminal;
    moving the highlight in the direction corresponding to the direction event; and
    executing, in response to releasing the pressure event, a menu operation indicated by the highlight.

11. The method of claim 10, wherein moving the highlight comprises rapidly moving the highlight in response to repeatedly detecting multiple direction events in the direction during a time period.

12. The method of claim 1, wherein performing at least one function comprises:
    identifying, when performing the menu navigation function, an application program on the mobile terminal; and
    displaying a menu item to control the identified application program according to the direction event.

13. The method of claim 1, further comprising, when the pressure event is detected, at least one of:
    displaying, on a display unit of the mobile terminal, a direction arrow image; and
    dimming a screen of the display unit being displayed when the pressure event is detected.

14. An apparatus, comprising:
    a pressure sensor to detect a pressure event according to a pressure applied to the mobile terminal;
    an orientation sensor to detect, while the pressure event is being detected, a direction event according to a movement of the mobile terminal in a direction, wherein an image indicating an direction is displayed to receive the direction event; and
    a control unit to control commencement of performing at least one function upon detection of the direction event and the pressure event, the at least one function comprising at least one of a content classification and storage function, a content display function, and a menu navigation function and to control completion of the performance of the at least one function in response to detection of release of the pressure event.

15. The apparatus of claim 14, further comprising:
    a display unit to display, in response to detection of the pressure event, a direction arrow on the image, the image comprising text information defining the at least one function.

16. The apparatus of claim 15, wherein the display unit is configured to display one arrow corresponding to the direction indicated by the direction event, the one arrow being displayed distinctively from other arrows in the direction arrow image.

17. The apparatus of claim 15, wherein the control unit is configured to create, when performing the content classification and storage function, a file folder corresponding to the direction, and to store, in response to detection of the direction event, a first content displayed on the display unit in a created file folder corresponding to the direction indicated by the direction event,
- wherein the control unit is configured to identify, when performing the content display function, a file folder corresponding to the direction, and to output at least one content stored in the identified file folder to the display unit, and
- wherein the control unit is configured to create, when performing the menu navigation function, a highlight on the screen, to move the highlight in the direction, and to execute, in response to release of the pressure event, a menu operation indicated by the highlight.

18. The apparatus of claim 17, wherein the control unit is configured to move the highlight rapidly in response to repeatedly detecting multiple direction events in the direction within a time period.

19. The apparatus of claim 15, wherein the display unit is configured to display a direction arrow image in response to detection of the pressure event, and to dim a screen being displayed on the display unit when the pressure event is detected.

20. The apparatus of claim 14, wherein the control unit is configured to identify, when performing the menu navigation function, an application program running on the mobile terminal, and to control the display unit to display a menu item to control the identified application program according to the direction event.

21. An apparatus, comprising;
- sensors, controllable by a control unit, comprising a first sensor, a second sensor, and a third sensor, the control unit configured:
  - to activate the first sensor to receive a touch sensing signal;
  - to activate the second sensor to receive a pressure sensing signal in response to detection of activation of the first sensor; and
  - to activate the third sensor to receive a direction sensing signal in response to detection of sustain of the pressure sensing signal while the second sensor being activated,
- wherein the control unit is further configured:
  - to display an image indicating a direction to receive a direction event, and
  - to control commencement of at least one function in response to detection of the pressure sensing signal and the direction sensing signal, and
  - to control completion of the at least one function in response to detection of release of the pressure sensing signal, and
- wherein the at least one function comprising a content classification and storage function, a content display function, and a menu navigation function.

22. A method for operating a terminal, the method comprising:
- displaying a content on a display of a terminal;
- receiving a first input to activate a motion sensor of the terminal;
- displaying, while the first input being detected, at least one indicator representing a direction superimposed over the displayed content and receiving a second input using the motion sensor in a direction corresponding to the at least one indicator displayed overlaying the displayed content; and
- performing at least one function in response to receipt of the second input.

23. The method of claim 22, wherein the function comprises at least one of a content classification, a storage function, and a menu navigation.

* * * * *